United States Patent [19]  
Morris et al.

[11] 4,257,483  
[45] Mar. 24, 1981

[54] METHOD OF WELL COMPLETION WITH CASING GEL

[75] Inventors: Earl F. Morris, Wagoner, Okla.; Dustin L. Free, Midland, Tex.; Roland L. Root, Tulsa; Thomas J. Griffin, Jr., Sand Springs, both of Okla.

[73] Assignee: The Dow Chemical Company, Midland, Mich.

[21] Appl. No.: 2,772

[22] Filed: Jan. 11, 1979

[51] Int. Cl.$^3$ .............................................. E21B 33/14
[52] U.S. Cl. ..................................... 166/292; 166/300
[58] Field of Search ............... 166/285, 289, 292, 300; 175/57; 106/900

[56] References Cited

U.S. PATENT DOCUMENTS

| | | | |
|---|---|---|---|
| 2,186,875 | 1/1940 | Matthews | 166/285 |
| 2,198,120 | 4/1940 | Lerch et al. | 166/292 |
| 2,742,090 | 4/1956 | Garrison | 166/292 X |
| 3,294,563 | 12/1966 | Williams | 106/900 X |
| 3,406,756 | 10/1968 | Carter et al. | 166/285 |
| 3,435,899 | 4/1969 | McLaughlin et al. | 166/292 |
| 3,464,493 | 9/1969 | Chancellor et al. | 166/285 |
| 3,474,866 | 10/1969 | Dellinger et al. | 166/289 |
| 3,713,488 | 1/1973 | Ellenburg | 166/285 |
| 3,857,445 | 12/1974 | Mower | 166/285 |
| 3,958,639 | 5/1976 | Daniel | 175/57 |
| 4,083,407 | 4/1978 | Griffin, Jr. et al. | 166/291 |
| 4,102,400 | 7/1978 | Crinkelmeyer et al. | 166/291 X |

OTHER PUBLICATIONS

*Oil and Gas Journal*, Jun. 21, 1971, pp. 115–119.
Henry, "Unorthodox Completion Salvages Protection String", *Petroleum Engineer*, Jun., 1975, pp. 79–81.

*Primary Examiner*—James A. Leppink
*Assistant Examiner*—George A. Suchfield
*Attorney, Agent, or Firm*—D. H. Fifield

[57] ABSTRACT

A method of well completion is provided which enables much of the well casing to be later recovered from the well in the event the well is later abandoned, or where intermediate casing must be run during drilling of the well but may later be removed when the liner is in place. The well is completed by any of several embodiments of manipulative steps, leaving the lower portion of the annulus filled with a conventional cementitious material and the upper portion of the annulus filled with an aqueous gel comprising effective quantities of water, a water soluble alkali metal silicate, and a water soluble metal compound capable of releasing a multivalent metal cation to react with the water soluble silicate. An economically significant portion of the casing can thereafter be recovered if necessary after first severing the casing above that portion adjacent the set cementitious material. Where an intermediate string of casing is employed only to facilitate drilling the remainder of the well, the cement may be omitted with respect to the intermediate string as is known in the art.

15 Claims, No Drawings

METHOD OF WELL COMPLETION WITH CASING GEL

BACKGROUND OF THE INVENTION

A. Field of the Invention

The present invention relates to a method of well completion, and more particularly to a method of cementing one or more conduits in a well. The completed well structure is also part of the invention.

B. Description of the Prior Art

In conventional well completion methods, casing is cemented in a wellbore with cementitious material filling substantially the entire annulus between the casing and the borehole. One or more additional concentric conduits, e.g., tubing, may also be cemented inside the casing in a similar manner. It is also known to complete wells where, for various purposes, only a portion of the overlap between tubing and casing members are cemented. An example of such a completion technique for a totally different purpose than that of the present invention is where an insulating fluid is maintained in a portion of an annulus in the completion of wells passing through permafrost.

The present invention is more directly concerned with the completion of wells where it may be desirable to abandon the well within the useful life of the tubular goods, i.e., casing, tubing, liners, or the like, used to complete the well, or where intermediate casing must be run during drilling of the well but may later be removed when the liner is in place. The cost of such an abandoned well or completion procedure is significantly reduced if a substantial proportion of the tubular goods can be recovered from the well for subsequent reuse.

A known technique for completing such wells is to employ a gel, sometimes referred to as a casing gel, in lieu of cementitious material over a substantial length of the tubular good. If abandonment of the well or removal of that string of tubular good later becomes desirable, the tubular good can be severed above the cementitious material using known techniques, and the upper portion of the tubular good adjacent the casing gel can then be retrieved from the well. Such a technique is discussed at pages 79–81 of the June, 1975 issue of *Petroleum Engineer*.

With the recent increase in deep well wildcatting in the central west Texas area where an intermediate casing string must be set, use of such a technique is desirable. However, prior art casing gels have been based on crosslinked or uncrosslinked organic gelling agents such as galactomannan gums or their derivatives or cellulose derivatives. Such prior art casing gels have been relatively susceptible to thermal and bacterial degradation. Consequently, operators have been reluctant to use the prior art casing gels where drilling is to continue for a considerable time after the intermediate string is set or where the tubular good in question is to removed only if the well is abandoned. Premature degradation of the gel could permit sloughing of intermediate water sensitive zones.

SUMMARY OF THE INVENTION

The present invention is based on the discovery that an improved casing gel is provided by a composition such as that described by Griffin, Jr., et al. in commonly assigned U.S. Pat. No. 4,083,407, the teachings of which are expressly incorporated herein.

Thus, one aspect of the present invention is a method of completing a well penetrating a subterranean formation where intermediate casing is used during drilling of the well only. In this aspect of the invention, a well is drilled to a first depth, surface casing is cemented in place, drilling is continued to a second depth at which time an intermediate string of casing is run and casing gel is placed in at least a portion of the annulus immediately surrounding the intermediate casing, drilling is continued through the intermediate casing to a third depth (which may be the total depth of the well or yet another intermediate depth), a smaller diameter tubular member is run inside the intermediate casing and is cemented in place, and finally at least a portion of the intermediate casing is removed.

Another aspect of the invention is a method of cementing a casing in a wellbore wherein a casing gel and a cementitious material are placed in the annulus between the casing and the borehole in such a manner that the cementitious material cures in the annulus adjacent the lower end of the casing and the casing gel is retained in the annulus above the cement, thereby facilitating subsequent severing and removal of that portion of the casing above the set cement. In this aspect, the lower portion of the annulus is normally defined by the outer surface of the casing and the wall of the open borehole, while the outer surface of the upper annulus may be either open borehole or the inner surface of a larger diameter tubular member.

Still another aspect of the invention is a completed well structure including a first conduit (e.g., the wall of the borehole itself or the inner surface of a large diameter casing) penetrating a subterranean formation, a second conduit concentrically suspended within the first (e.g., casing within a borehole or a smaller diameter casing within a larger diameter casing) and defining an annulus in cooperation with the first, set cementitious material in the annulus over a portion of the length of the second conduit, and an aqueous casing gel in the annulus over another portion, e.g., usually the upper portion, of the length of the second conduit.

Each aspect of the invention is based on the improvement of using as the casing gel, a composition comprising (a) water;
(b) a water soluble metal silicate; and
(c) a water soluble metal compound capable of releasing a multivalent metal cation to react with the water soluble silicate;

said components (a)–(c) being provided in amounts effective to form an aqueous gel.

FURTHER DESCRIPTION OF THE INVENTION

As used herein, and in the appended claims, "cementitious material" refers not only to hydraulic cements such as portland and aluminous based cements as are commonly used in well cementing applications, but also to materials which are occasionally used for an equivalent function such as various resin systems.

The abbreviation "BWOW" as used herein and in the appended claims means "by weight of water".

The water employed in the casing gel of the present invention may be fresh water or brine. Polyvalent metal cations in the water supply may furnish a portion or all of the polyvalent metal cation component necessary for the practice of the invention.

Water soluble silicates which can be employed include alkali metal silicates in both anhydrous and hydrated forms, e.g., ortho-, sesqui- and meta- silicates. General references on water soluble silicates are Vail, *Soluble Silicates, Their Properties and Uses*, Reinhold Publishing Co. (1952); Iler, *The Colloid Chemistry of Silica and Silicates;* and Vail, *Soluble Silicates in Industry*, The Chemical Catalog Co. (1928); the teachings of each of which are incorporated herein. Specific silicates which can be employed include, for example, lithium, sodium and potassium silicates. Specific silicate compounds which are useful are anhydrous sodium meta-silicate ($Na_2SiO_3$), hydrous sodium meta-silicate ($Na_2SiO_3.9H_2O$), sodium orthosilicate ($Na_4SiO_4$), and corresponding lithium and potassium compounds.

Water soluble metal compounds which can be employed include, for example, certain water soluble oxides, salts (e.g., acetates, halides, nitrates or sulfates) and hydroxides of multivalent metal cations. Water soluble compounds of such metals as alkaline earth metals, aluminum, copper, zinc, iron, and chromium, are exemplary of suitable compounds. The metal compound should be soluble in water to the extent of at least about 0.01 percent by weight at a temperature of 60° F. Most preferred is calcium chloride, which is highly soluble as contrasted to, for example, calcium oxide.

Certain combinations of water soluble metal compounds when employed with water soluble silicates are more effective in the practice of the invention than are certain other combinations. Therefore, in any particular application preliminary evaluation of specific water soluble multivalent metal compounds with specific water soluble silicates should preferably be made to determine the most effective combination. For example, it appears that water soluble metal compounds wherein the metal is divalent form gels quicker and better than do compounds containing trivalent cations and thus the divalent compounds are preferred when such properties are desired. Moreover, calcium compounds appear to be preferred when anhydrous sodium meta-silicate is employed. Calcium chloride, calcium acetate and cupric chloride are preferred with hydrous sodium meta-silicate, with calcium chloride being most preferred. Calcium chloride is preferred with sodium ortho-silicate.

Where both the silicate and the polyvalent metal cation releasing compound are provided in particulate form, the silicate is more easily dispersed and dissolved in the water if the polyvalent metal cation releasing compound is added to the water prior to or concurrently with the silicate.

The gel may be prepared prior to injection into the well, in which case the gel structure should not be so great that the gel is not pumpable with the equipment utilized or without fracturing the formation. Alternatively, one of the components—preferably the silicate—may be added to the remaining components as the fluid is being injected into the well so that the gel forms as it is travelling to its final position.

The silicate and the polyvalent metal cation releasing compound are provided in the water in amounts so that they cooperate to form a gel. Generally, the water soluble silicate (calculated on an anhydrous basis) is provided in an amount of from about 0.1 to about 5 weight percent of the water, preferably 0.5 to about 4 percent, and most preferably about 2-4 percent, and the water soluble metal compound is provided in an amount sufficient to release for reaction with the silicate, from about 30 to about 130 percent of the molar equivalents of the polyvalent metal cation theoretically necessary to replace the alkali metal cation of the water soluble alkali metal silicate, e.g., about 0.3-1.3 moles of $Ca^{++}$ per mole of sodium meta-silicate. Preferably, the metal compound releases from about 40 to about 100 percent of the stoichiometric amount of the metal cation. To obtain an adequate gel within a practical amount of time, appropriate allowance should be made where the metal compound dissolves slowly or is of low solubility. For example, whereas an optimum of about 1 mole of calcium chloride is employed per mole of sodium meta-silicate, an amount in excess of 2 moles is optimum where calcium oxide, calcium sulfate dihydrate, and the like are employed. While it is possible to practice the essence of the invention somewhat outside the foregoing ranges, there is rarely an advantage in doing so.

Preferably, the thickening and/or gelling components of the casing gel fluid consist essentially of inorganic components, since organic components render the gel more susceptible to degradation. Thus, the fluid loss control embodiment described at column 6, lines 3-50 of Griffin, Jr., et al. U.S. Pat. No. 4,083,407 is preferably not employed in the present invention, although it may be employed if desired where the casing gel is to be in place only a relatively brief period or at relatively low temperatures.

Optionally, and particularly when employed both as a casing gel and as a spacer as in Griffin, Jr., et al. U.S. Pat. No. 4,083,407, the casing gel composition may contain a weak chelating agent for polyvalent metal cations in an amount of up to about 2 percent by weight of the water. By "weak chelating agent" is meant an agent which will chelate or precipitate polyvalent metal cations in the substantial absence of unreacted sites on the silicate, but which will not prevent reaction of polyvalent metal cations with the silicate so long as a reaction would otherwise occur between the silicate and the cation but for the presence of the chelating agent. Thus, the purpose of the chelating agent is to act as a scavenger for any excess polyvalent metal cations which could flocculate the drilling mud. The weak chelating agent, however, does not significantly affect the reaction of the polyvalent metal cations with the silicate. Suitable chelating agents for this purpose include citric acid, alkali metal citrates, alkali metal hexametaphosphates, alkali metal tetraphosphates, alkali metal bicarbonates, sodium acid pyrophosphate, and the like. Most preferably, about 1 percent sodium citrate dihydrate is employed, by weight of water.

Particulate materials may also be employed if desired, such as weighting agents, lost circulation control, and the like. Materials such as bentonite, finely divided particulate such as silica flour, and the like may be employed if desired to further enhance the gel strength and viscosity if desired.

Where a formation is present which is sensitive to fresh water, such as certain shales or clay containing sandstone, a salt such as an alkali metal halide may be incorporated in the casing gel.

In practicing the present invention, the casing gel fluid may be placed in the annulus by conventional techniques. Thus, it may be injected down the annulus, or, it may be injected down the casing and up the annulus either alone or ahead of cement. In another embodiment, a suitable normally closed valve means, e.g. a stage collar, may be provided in the casing string to provide, when opened, fluid communication between the inside of the casing and the annulus. The lower portion of the casing may be cemented in place in a conventional manner to a height below the position of the valve. After the cement has set, the valve may then be opened and the casing gel pumped down the casing, through the valve, and thence into the annulus above the set cement.

EXAMPLE

An intermediate 8⅝" casing was set at a total depth of 4250 feet in Hockley County, Texas in a 12¼" inch hole. Approximately 500 barrels of water into which had been dissolved about 2% BWOW calcium chloride flake containing a nominal 77-80 weight percent $CaCl_2$, the balance being substantially water of hydration, was injected down the casing and up into the annulus. About 3% BWOW anhydrous sodium meta-silicate was continuously metered into the calcium chloride solution as the fluid was injected to form the casing gel of the present invention. The casing gel fluid was followed by 10 barrels of a fresh water spacer and 94 barrels of a Class "C" hydraulic cement slurry. The cementing plug was dropped and displaced with 264 barrels of water. Subsequently, about 97% of the casing string was recovered from the well.

What is claimed is:

1. A well structure of the type including a first conduit penetrating a subterranean formation, a second conduit concentrically suspended within said first conduit, the outer surface of the second conduit and the inner surface of the first conduit defining an annulus, set cementitious material in the annulus over a portion of the length of the second conduit bonding the second conduit to the first conduit over said portion, and an aqueous casing gel in the annulus over another portion of the length of the second conduit, the improvement which comprises: as the casing gel,
   (a) water
   (b) a water soluble alkali metal silicate; and
   (c) a water soluble metal compound capable of releasing a multivalent metal cation to react with the water soluble silicate
said components (a)-(c) being provided in amounts effective to form an aqueous gel.

2. The well structure of claim 1 wherein in the casing gel, said silicate is present in an amount of from 0.1-5 percent BWOW, and the metal compound is present in an amount sufficient to release from about 30-130 percent of the molar equivalents of the polyvalent metal cation stoichiometrically required to react with the alkali metal silicate.

3. The structure of claim 2 wherein the metal compound is selected from the group consisting of the water soluble oxides, salts, and hydroxides of alkaline earth metals, aluminum, calcium, copper, zinc, iron, and chromium.

4. The structure of claim 3 wherein the metal compound provides $Ca^{++}$.

5. The structure of claim 2 wherein in the casing gel, the silicate is present in an amount of from about 0.5-4 percent BWOW, and the metal compound is present in an amount sufficient to release from about 40-100 percent of the polyvalent metal cation stoichiometrically required to react with the silicate.

6. The structure of claim 5 wherein in the casing gel, the silicate is sodium meta-silicate and the metal compound is calcium chloride, said sodium meta-silicate being present in an amount of from about 2 to about 4 percent BWOW.

7. In a method of cementing a casing in a wellbore so that at least a portion of said casing may subsequently be removed therefrom, wherein a casing gel fluid and a cementitious material are placed in the annulus between the casing and the borehole in such a manner that said cement cures in the annulus adjacent the lower end of the casing and said casing gel is retained in said annulus above said set cement, thereby facilitating subsequent severing and removal of that portion of the casing above the set cement, the improvement which comprises: employing more than 500 feet of a gel comprised of
   (a) water;
   (b) a water soluble alkali metal silicate; and
   (c) a water soluble metal compound capable of releasing a multivalent metal cation to react with the water soluble silicate
as the casing gel, said components (a)-(c) being provided in amounts effective to form an aqueous gel.

8. The method of claim 7 wherein the cementitious material is a hydraulic cement slurry and wherein the casing gel components and then the cement slurry are injected down the interior of the casing and thence up the annulus.

9. The method of claim 7 wherein the casing includes normally closed valve means at an intermediate point in the casing wall to provide fluid communication from the interior to the exterior of the casing at said point; wherein the cementitious material is a hydraulic cement slurry; and wherein said slurry is placed into its preselected position, said valve means is opened to provide fluid communication from the interior of the casing to the annulus at an intermediate point along the length of casing but above the level of the cement slurry, and said casing gel is injected into the casing, through the valve means, and thence into position in the annulus above the cement.

10. The method of claim 7, 8, or 9 wherein in the casing gel, said silicate is present in an amount of from 0.1-5 percent BWOW, and the metal compound is present in an amount sufficient to release from about 30-130 percent of the molar equivalents of the polyvalent metal cation stoichiometrically required to react with the alkali metal silicate.

11. The method of claim 10 wherein the metal compound is selected from the group consisting of the water soluble oxides, salts, and hydroxides of alkaline earth metals, aluminum, calcium, copper, zinc, iron, and chromium.

12. The method of claim 11 wherein the metal compound provides $Ca^{++}$.

13. The method of claim 10 wherein in the casing gel, the silicate is present in an amount of from about 0.5-4 percent BWOW, and the metal compound is present in an amount sufficient to release from about 40-100 percent of the polyvalent metal cation stoichiometrically required to react with the silicate.

14. The method of claim 13 wherein in the casing gel, the silicate is sodium meta-silicate and the metal compound is calcium chloride, said sodium meta-silicate being present in an amount of from about 2 to about 4 percent BWOW.

15. The method of claim 7 wherein a portion of the casing above the set cement is subsequently severed and removed.

* * * * *